(12) United States Patent
Petersen

(10) Patent No.: US 12,472,910 B2
(45) Date of Patent: Nov. 18, 2025

(54) METHOD OF OPERATING A BRAKE SYSTEM FOR A MOTOR VEHICLE AND CORRESPONDING BRAKE SYSTEM

(71) Applicant: AUDI AG, Ingolstadt (DE)

(72) Inventor: Krister Petersen, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 288 days.

(21) Appl. No.: 18/187,858

(22) Filed: Mar. 22, 2023

(65) Prior Publication Data
US 2023/0339442 A1    Oct. 26, 2023

(30) Foreign Application Priority Data
Apr. 26, 2022   (DE) .................. 102022110059.6

(51) Int. Cl.
*B60T 7/12* (2006.01)
*B60T 8/173* (2006.01)
(Continued)

(52) U.S. Cl.
CPC ............. *B60T 7/12* (2013.01); *B60T 8/173* (2013.01); *B60T 8/1755* (2013.01); *B60T 8/72* (2013.01); *B60T 8/74* (2013.01); *B60T 8/76* (2013.01); *B60T 8/885* (2013.01); *B60T 8/96* (2013.01); *B60T 17/12* (2013.01); *B60T 17/22* (2013.01);
(Continued)

(58) Field of Classification Search
CPC .......... B60T 7/12; B60T 8/173; B60T 8/1755; B60T 8/72; B60T 8/74; B60T 8/76; B60T 8/885; B60T 8/96; B60T 17/22; B60T 2270/413; B60T 2270/416
See application file for complete search history.

(56) References Cited

U.S. PATENT DOCUMENTS 4,561,527 A * 12/1985 Nakamoto ............... B60T 7/12
                                                        192/35
4,821,042 A *  4/1989 Ohe ...................... H01Q 1/32
                                                        343/855
(Continued)

FOREIGN PATENT DOCUMENTS

DE    2741377 A1    3/1978
DE    2814545 A1    11/1978
(Continued)

OTHER PUBLICATIONS

Extended European Search Report issued on Feb. 10, 2023, in corresponding European Application No. 23157053.2, 18 pages.
(Continued)

*Primary Examiner* — Phutthiwat Wongwian
*Assistant Examiner* — Brian R Kirby
(74) *Attorney, Agent, or Firm* — Maier & Maier, PLLC

(57) ABSTRACT

A method of operating a brake system for a motor vehicle, the brake system has a parking brake device and actuating the parking brake device for generating a parking braking force on a wheel of the motor vehicle is only permitted if a speed value falls below a speed threshold value. As such, the speed value is determined from a measured speed value corresponding at least temporarily to a speed of the motor vehicle. If the measured speed value falls below the speed value, the speed value is made to track the measured speed value with a speed gradient limited to a speed gradient limit value.

20 Claims, 1 Drawing Sheet

(51) Int. Cl.
*B60T 8/1755* (2006.01)
*B60T 8/72* (2006.01)
*B60T 8/74* (2006.01)
*B60T 8/76* (2006.01)
*B60T 8/88* (2006.01)
*B60T 8/96* (2006.01)
*B60T 17/12* (2006.01)
*B60T 17/22* (2006.01)

(52) U.S. Cl.
CPC ....... *B60T 2240/00* (2013.01); *B60T 2250/04* (2013.01); *B60T 2270/10* (2013.01); *B60T 2270/406* (2013.01); *B60T 2270/413* (2013.01); *B60T 2270/416* (2013.01)

(56) References Cited

U.S. PATENT DOCUMENTS

| | | | | |
|---|---|---|---|---|
| 6,302,823 | B1 * | 10/2001 | Eckert | B60W 10/06 477/186 |
| 6,626,271 | B1 | 9/2003 | Böhm et al. | |
| 6,758,087 | B2 * | 7/2004 | Balch | G01P 3/56 73/488 |
| 8,086,384 | B2 * | 12/2011 | Nakayama | B60T 13/74 701/79 |
| 8,924,105 | B1 * | 12/2014 | Miesterfeld | B60T 7/12 701/53 |
| 2004/0090112 | A1 * | 5/2004 | Tachiiri | B60T 7/107 303/20 |
| 2005/0194837 | A1 * | 9/2005 | Loring | B60L 7/26 303/155 |
| 2007/0265756 | A1 * | 11/2007 | Joyce | B60W 40/105 701/72 |
| 2008/0086252 | A1 * | 4/2008 | Nakayama | B60T 7/122 701/80 |
| 2008/0148827 | A1 * | 6/2008 | Keski-Hynnila | G01M 15/05 73/114.74 |
| 2011/0004386 | A1 * | 1/2011 | Kinder | B60T 8/885 701/70 |
| 2018/0345921 | A1 | 12/2018 | Mannherz et al. | |
| 2021/0009092 | A1 * | 1/2021 | Udvardy | B60T 13/741 |

FOREIGN PATENT DOCUMENTS

| | | |
|---|---|---|
| DE | 102004026777 A1 | 2/2005 |
| DE | 102014018365 A1 | 6/2016 |
| GB | 2483719 A | 3/2012 |
| WO | WO-2015058973 A1 * | 4/2015 ............. B60T 7/107 |

OTHER PUBLICATIONS

Search Report issued on Jan. 26, 2023, in corresponding German Application No. 102022110059.6, 12 pages.

* cited by examiner

METHOD OF OPERATING A BRAKE SYSTEM FOR A MOTOR VEHICLE AND CORRESPONDING BRAKE SYSTEM

FIELD

The invention relates to a method of operating a brake system for a motor vehicle, wherein the brake system has a parking brake device and actuating the parking brake device for generating a parking braking force on a wheel of the motor vehicle is only permitted if a speed value falls below a speed threshold value. The invention also relates to a brake system for a motor vehicle.

BACKGROUND

As an example, document DE 10 2014 018 365 A1 is known from the prior art. It describes a method of applying an electric parking brake apparatus of a motor vehicle, having a manually operated emergency shut-off operating element and a disconnection apparatus for disconnecting an electrical voltage supply means from the on-board electrical system as a result of operation of the emergency shut-off operating element. The method comprises the steps of (a) if a speed of the motor vehicle is not greater than a predetermined first threshold value when the emergency shut-off operating element is operated, then: (a1) applying the electric parking brake, and (a2) setting a delay time of the disconnection apparatus to a first value; and (b) if the speed of the motor vehicle is greater than the predetermined first threshold value when the emergency shut-off operating element is operated, then: (b1) setting the delay time of the disconnection apparatus to a second value which is greater than the first value, (b2) determining a braking request to the electric service brake, and (b3) applying the electric parking brake as soon as a speed of the motor vehicle is less than or equal to a predetermined second threshold value.

SUMMARY

It is an object of the invention to propose a method of operating a brake system for a motor vehicle, which has advantages over known methods, in particular allowing the parking brake device to be actuated reliably only if the speed of the motor vehicle is sufficiently low.

According to the invention, this is achieved by a method of operating a brake system for a motor vehicle. As such, it is provided that the speed value is determined from a measured speed value corresponding at least temporarily to a speed of the motor vehicle, wherein, if the measured speed value falls below the speed value, the speed value is made to track the measured speed value with a speed gradient limited to a speed gradient limit value.

The method is for operating the brake system. Preferably, the latter is part of the motor vehicle but can of course also be separate therefrom. The brake system is for slowing down the motor vehicle, i.e., for reducing the speed of the motor vehicle, in particular until it is stopped, and/or for immobilizing the motor vehicle when stopped. For the former, the brake system has, for example, a service brake which preferably applies a braking force to all wheels of the motor vehicle.

To immobilize the motor vehicle when stopped, the brake system has the parking brake device. Preferably, it acts only on part of the wheels of the motor vehicle, at least only on the wheel already mentioned. Preferably, the wheel is part of several wheels to which the parking brake device applies the parking braking force temporarily. For example, the parking brake device applies the parking braking force only to wheels of a single wheel axle of the motor vehicle, in particular a rear wheel axle or a front wheel axle of the motor vehicle. For the purposes of this description, the parking braking force is understood to mean a braking force applied by the parking brake device or the braking force of the parking brake device.

The braking force applied by means of the service brake can typically be adjusted as desired. As such, it is preferably selected such that locking of the respective wheel is avoided at least temporarily. Thus, if such locking or at least impending locking is detected, the braking force is reduced, in particular until the locking no longer occurs or the impending locking is no longer detected. For this purpose, the brake system or the service brake preferably has an anti-lock braking system. On the other hand, the parking brake device preferably only allows to adjust a braking force directed to the locking of the wheel or the respective wheel. Thus, by actuating the parking brake, the wheel is locked in order to immobilize the motor vehicle when stopped. For this reason, actuating the parking brake device is to be avoided as long as the motor vehicle is in motion, i.e., its driving speed is different from zero or at least corresponds to or is greater than the speed threshold value. Consequently, actuating the parking brake device should only be permitted if the speed value falls below the speed threshold value, i.e., the speed value is less than the speed threshold value. This reliably prevents locking of the wheel due to actuating the parking brake while the motor vehicle is driving. When comparing the speed value to the speed threshold value, absolute values are compared with one another, i.e., the absolute value of the speed value is compared to the absolute value of the speed threshold value so that a sign-independent comparison is implemented.

In order to be able to reliably permit or prevent the actuating of the parking brake as a function of the speed value, the speed value must map the actual speed of the motor vehicle as realistically as possible. For this reason, the speed value is determined from the measured speed value which at least temporarily corresponds to the speed of the motor vehicle. The measured speed value is a measured value, i.e., a value measured by means of a sensor. It is measured such that it corresponds at least temporarily to the actual speed of the motor vehicle. For example, first, a wheel rotational speed of the wheel of the motor vehicle is measured, in particular by means of a wheel rotational speed sensor, and the measured speed value is determined from the rotational speed.

However, if the wheel locks at the time of measuring its rotational speed, the measured speed value determined from the rotational speed deviates from the actual speed of the motor vehicle, sometimes considerably. Thus, if a wheel is completely locked, the rotational speed is zero so that the measured speed value is also zero. Consequently, in this state, the parking brake device for generating the parking braking force could be actuated although the motor vehicle is still in motion.

To avoid this, the speed value is not directly set equal to the measured speed value. Instead, it is provided that the speed value is only made to track the measured speed value at least temporarily. This occurs such that, if the measured speed value falls below the speed value, the speed value is adapted to the limited speed gradient. Thus, if the measured speed value is less than the speed value, adapting the speed value towards the measured speed value only occurs with the limited speed gradient.

This should be understood to mean that the speed gradient is calculated over time which is present when the speed value is directly set to the measured speed value. If this speed gradient is greater than the speed gradient limit value, the speed gradient is limited to the speed gradient limit value and the speed value is adapted towards the measured speed value only with the limited speed gradient.

Limiting the speed gradient occurs towards greater speed gradients so that the speed gradient is capped to the speed gradient limit value. Consequently, the limited speed gradient is always less than or equal to the speed gradient limit value. Preferably, the limiting itself occurs using absolute values, so that an absolute value of the speed gradient is limited to the absolute value of the speed gradient limit value in order to avoid an influence of the respective sign.

If the measured speed value exceeds the speed value, then it may be provided to directly set the speed value to equal the measured speed value, i.e., so it tracks the same directly and without limitation of the speed gradient. However, other variations are also possible.

The procedure described has the advantage that, even with a measured speed value which differs from the actual speed of the motor vehicle, actuating the parking brake can be reliably prevented when the speed of the motor vehicle is too high. For this purpose, it is assumed that the deceleration of the motor vehicle, i.e., a reduction of its speed, cannot be accomplished at any desired speed, but rather, at the most, with the speed gradient corresponding to the speed gradient limit value. This is particularly advantageous if the motor vehicle is designed as an electric motor vehicle. With such a vehicle, there is no mechanical prevention system, for example, based on lubricant pressure, which could prevent actuating the parking brake device, in particular the parking brake device configured as a stop lock or parking lock.

Preferably, the procedure described is used, in particular only, if the rotational speed of the wheel cannot be reliably determined. This is the case, for example, if a wheel rotational speed sensor used for measuring the rotational speed of the wheel is defective and/or supplies non-plausible values for the wheel rotational speed of the wheel, or if an anti-lock braking system associated with the wheel does not work at all or at least not reliably. In the first case, the rotational speed of the wheel cannot be determined directly; in the latter case, it is unclear whether the wheel rotational speed measured by means of the wheel rotational speed sensor corresponds to the actual rotational speed of the wheel. In particular, the case could arise that the wheel is locked, for example due to application of a braking force by means of the service brake, and consequently, a wheel rotational speed is measured which is less than the wheel rotational speed corresponding to the instantaneous speed of the motor vehicle, for example, equals zero. Particularly in the cases mentioned, a faulty actuation of the parking brake for generating the parking braking force can be reliably avoided by means of the procedure described.

A development of the invention provides that, if an actuation signal is present, the parking brake device is actuated to augment a current parking braking force generated thereby if the speed value is less than the speed threshold value, and is actuated to reduce or keep constant the current parking braking force if the speed value is greater than or equal to the speed threshold value. The actuation signal should be understood to mean a signal directed at actuating the parking brake device. For example, the actuation signal is generated as a function of a specification by a user of the motor vehicle, in particular as a function of an adjustment of an operating element of the motor vehicle.

Preferably, with a first adjustment of the operating element, the actuation signal is not generated and is generated with a second adjustment.

The parking brake device is actuated as a function of the actuation signal. It is preferably provided that, in the absence of the actuation signal, the parking brake device is actuated to reduce the current parking braking force, in particular to reduce the current parking braking force to zero. If, on the other hand, the actuation signal is present, the speed value is compared to the speed threshold value. If the speed value is less than the speed threshold value, then the parking brake device is actuated to augment the current parking braking force, namely, to augment the current parking braking force towards the parking braking force, preferably up to the parking braking force.

If, on the other hand, the speed value at least corresponds to the speed threshold value, i.e., if it is greater than the speed threshold value or equal to the speed threshold value, then the parking brake device is to be actuated to reduce or keep constant the current parking braking force, preferably the former. In this case, it is particularly preferable to actuate the parking brake device to reduce the current parking braking force to zero. This achieves the advantageous behavior of the brake system already explained.

A development of the invention provides that the measured speed value is determined at least temporarily from a wheel rotational speed measured by means of a wheel rotational speed sensor and/or at least temporarily from a rotational speed of a drive unit drivingly connected to the wheel axle. Reference has already been made to using the wheel rotational speed to determine the measured speed value. Additionally or alternatively, the measured speed value can be determined at least temporarily from the rotational speed of the drive unit.

The drive unit is drivingly connected to the wheel axle and, in this respect, drivingly coupled thereto at least temporarily, preferably rigidly. This means that the rotational speed of the drive unit is at least temporarily proportional to the rotational speed of the wheel. Correspondingly, the rotational speed of the drive unit corresponds at least temporarily to the speed of the motor vehicle and can be used to determine the measured speed value. However, in this procedure as well, the measured speed value can deviate from the actual speed of the motor vehicle, in particular in the case of a locking wheel. For this reason, tracking the speed value as a function of the measured speed value as described is beneficial to the safety of the motor vehicle in any case.

A development of the invention provides that the measured speed value is determined from the wheel rotational speed measured by means of the wheel rotational speed sensor, as long as a plausibility check of the wheel rotational speed is successful, and is determined from the rotational speed of the drive unit in the event of a failed plausibility check. Ideally, therefore, the measured wheel rotational speed is used to determine the measured speed value. This takes place as long as the plausibility check of the wheel rotational speed is successful. The plausibility check should be understood to mean that the measured wheel rotational speed itself or another parameter of the brake system is monitored for whether the wheel rotational speed corresponds to the actual speed of the motor vehicle.

For this purpose, it is checked, for example, whether the measured wheel rotational speed is in a specific rotational speed range, in particular is different from zero. In particular, the parameter of the brake system is a functionality parameter of the anti-lock braking system. If the functionality parameter indicates that the anti-lock braking system is working faultlessly, the measured speed value is determined from the measured wheel rotational speed. If, on the other hand, it indicates that a fault is present, the plausibility check fails and the measured speed value is preferably determined from the rotational speed of the drive unit. This procedure is based on the fact that the wheel rotational speed sensor is typically part of the anti-lock braking system so that, if the anti-lock braking system does not work, a malfunction of the wheel rotational speed sensor is assumed. The procedure described makes it possible to reliably actuate the parking brake device as a function of the speed value.

A development of the invention provides that, if the speed value is exceeded by the measured speed value, the speed value is set equal to the measured speed value or is made to track the measured speed value with a speed gradient limited to a further speed gradient limit value. The first procedure corresponds to direct tracking of the speed value as a function of the measured speed value. In the context of the second procedure mentioned, the tracking with the limited speed gradient is implemented not only if the measured speed value falls below the speed value but also if it is greater than the same. In this case, the speed gradient limit value is used for if below and the further speed gradient limit value for if greater than the speed value. The speed gradient limit value can also be referred to as a first speed gradient limit value and the further speed gradient limit value can also be referred to as a second speed gradient limit value.

The first speed gradient limit value and the second speed gradient limit value may correspond to one another or may be different from one another, in particular with respect to their absolute values. For example, the second speed gradient limit value is greater than the first speed gradient limit value. Preferably, the second speed gradient limit value corresponds to the first speed gradient limit value multiplied by a factor greater than one. Preferably, the factor is at least 2, at least 3, at least 4, at least 5 or at least 6. Additionally or alternatively, the factor is not more than 10, not more than 8 or not more than 6. In other words, the factor is, for example, at least 2 and not more than 10, at least 3 and not more than 8, at least 4 and not more than 6 or at least 4 and not more than 6.

For example, the first speed gradient limit value is at least $0.25 \text{ m/s}^2$ and not more than $1.75 \text{ m/s}^2$, at least $0.5 \text{ m/s}^2$ and not more than $1.5 \text{ m/s}^2$ or at least $0.75 \text{ m/s}^2$ and not more than $1.25 \text{ m/s}^2$. Preferably, the first speed gradient limit value is exactly or approximately $1 \text{ m/s}^2$. This assumption is based on the friction value between the wheel and a ground underneath the motor vehicle always being at least 0.1 and the deceleration thus being achieved even if the wheel is locked. It is particularly preferred to assume a higher possible deceleration, so that the first speed gradient limit value is at least $1 \text{ m/s}^2$ and not more than $3 \text{ m/s}^2$ or at least $1 \text{ m/s}^2$ and not more than $2 \text{ m/s}^2$. Overall, with the procedure described, the parking brake device can be actuated particularly reliably.

A development of the invention provides that the speed gradient limit value and/or the further speed gradient limit value is/are set to be constant or are determined as a function of the speed value. For example, one or more of the speed gradient limit values mentioned are set to one of the values or value ranges mentioned. However, it may also be contemplated to variably determine at least one of the speed gradient limit values, in particular as a function of the speed value. Preferably, the respective speed gradient limit value is selected to be the greater, the greater the speed value. In each case, a speed value is achieved which is continuously greater than or equal to the actual speed of the motor vehicle, so that the parking brake device can be actuated reliably.

A development of the invention provides that determining the speed value from the measured speed value is carried out with limitation of the speed gradient in a first operating mode, and that the speed value is determined from the measured speed value without limitation in a second operating mode. The procedure described above, in which the speed gradient is limited to the speed gradient limit value, is therefore only performed in the first operating mode.

However, the second operating mode is implemented in addition to the first operating mode, wherein it is possible to switch between the two operating modes. In the second operating mode, the speed value is determined from the measured speed value without limitation, in particular by setting the speed value to equal the measured speed value. Here, it should be noted that the second operating mode is always added on top of the first operating mode. Thus, it is not intended for the brake system to operate only and continuously in the second operating mode, but instead switching to the first operating mode is always possible. The procedure described enables reliably actuating the parking brake device by—if necessary—making reasonable assumptions about the speed value, but at times the measured speed value is also used directly as the speed value.

A development of the invention provides that a diagnosis of an anti-lock braking system of the brake system is carried out, wherein, if an error of the anti-lock braking system is detected, the first operating mode is carried out, and if the anti-lock braking system is faultless, the second operating mode is carried out. The anti-lock braking system is provided and designed to prevent the wheel of the motor vehicle from locking. For this purpose, the current rotational speed of the wheel is determined by means of the wheel rotational speed sensor, and if the current rotational speed deviates from a target rotational speed determined within the framework of a model, the current braking force acting on the wheel is reduced. For this purpose, the anti-lock braking system is part of the service brake or at least associated with the service brake.

As long as the anti-lock braking system operates satisfactorily, it can be assumed that the wheel is reliably prevented from locking. If, on the other hand, there is a fault in the anti-lock braking system, this may not be the case. Consequently, in the case of the fault of the anti-lock braking system, the first operating mode is used. However, if the anti-lock braking system operates faultlessly, the second operating mode is used, in which the speed value is determined from the measured speed value without limitation. This improves the accuracy of the speed value.

A development of the invention provides that a parking brake and/or a stop lock is used as the parking brake device. Preferably, the parking brake acts directly on the wheel of the motor vehicle. On the other hand, for example, the stop lock is part of a vehicle transmission of the motor vehicle, which is drivingly arranged between the drive unit and the wheel. The stop lock is used to immobilize at least one shaft of the vehicle transmission by which the wheel is also immobilized due to the driving connection of the wheel to the vehicle transmission. In each case, a reliable immobilization of the wheel is achieved.

The invention also relates to a brake system for a motor vehicle, in particular for carrying out the method according to what is shown in this description, wherein the brake system has a parking brake device and actuating the parking brake device for generating a parking braking force on a wheel of the motor vehicle is only permitted if a speed value falls below a speed threshold value. As such, the brake system is intended and designed to determine the speed value from a measured speed value corresponding at least temporarily to a speed of the motor vehicle, wherein, if the measured speed value falls below the speed value, the speed value is made to track the measured speed value with a speed gradient limited to a speed gradient limit value.

The advantages of such an embodiment of the brake system or such a procedure have already been pointed out. Both the brake system and the method of operating the same may be developed according to what is shown in this description, so that reference is made thereto in this respect.

The features and combinations of features described in the description, in particular the features and combinations of features described in the following description of the figures and/or shown in the figures, can be used not only in the combination respectively indicated, but also in other combinations or alone, without deviating from the scope of the invention. Thus, embodiments which are not explicitly shown or explained in the description and/or the figures but which are apparent or can be derived from the embodiments explained are also to be regarded as encompassed by the invention.

BRIEF DESCRIPTION OF THE FIGURES

In the following, the invention is explained in more detail by way of exemplary embodiments shown in the drawing, without limiting the invention. Therein.

DETAILED DESCRIPTION

Figure 1:
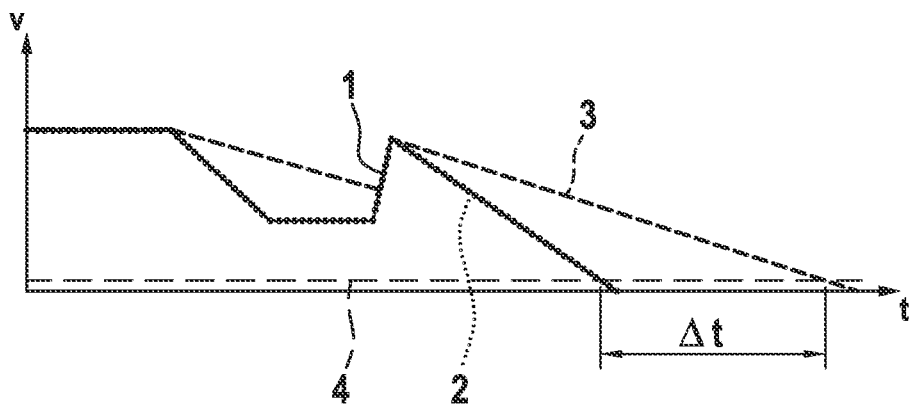
FIG. 1 shows a first plot in which, by way of example only, an actual speed of the motor vehicle, a measured speed value and a speed value are plotted over time.

FIG. 1 shows a plot in which, by way of example only, speed curves 1, 2 and 3 are plotted over time. Here, speed curve 1 describes an actual speed of a motor vehicle, speed curve 2 describes a measured speed value and speed curve 3 describes a speed value determined from the measured speed value. A speed threshold value 4 is also implied. The two speed curves 1 and 2 match. This means that the measured speed value always corresponds to the actual speed of the motor vehicle.

The speed value according to speed curve 3 is determined from the measured speed value. This occurs such that, if the measured speed value exceeds the speed value, the speed value is set to equal the measured speed value. If, on the other hand, the measured speed value falls below the speed value, then the speed value is made to track to the measured speed value, namely with a limited speed gradient. In this respect, the speed gradient is limited to a speed gradient limit value.

This procedure can be seen clearly from a comparison between speed curves 1, 2 and 3. If the motor vehicle is decelerated down to a stop in accordance with speed curve 1, the limited speed gradient results in a slower drop in the speed value compared to the measured speed value. Consequently, speed curve 3 falls below speed threshold value 4 later than speed curve 2, namely offset by a time offset Δt.

The described method of determining the speed value is used to actuate a parking brake device of the motor vehicle as appropriate to the situation. Thus, actuating the parking brake device for generating a parking braking force on a wheel of the motor vehicle is only to be permitted if the speed value is less than the speed threshold value. Compared to the use of the measured speed value as the speed value, this results in a delay in permitting actuating the parking brake for generating the parking braking force by the time offset Δt.

Figure 2:
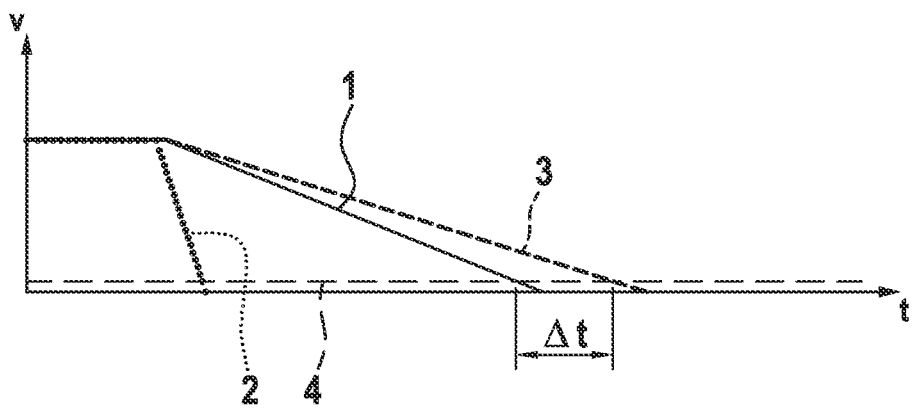
FIG. 2 shows a second plot in which the actual speed, the measured speed value and the speed value are plotted over time.

FIG. 2 shows another plot in which speed curves 1, 2 and 3 and speed threshold value 4 are plotted over time. It can be seen clearly that speed curves 1 and 2 now differ from one another. This is the case because the wheels of the motor vehicle are locked. If only the measured speed value were to be used to carry out the on-demand actuation of the parking brake device, then the parking braking force on the wheel axle of the motor vehicle could already be generated by means of the parking brake device before the motor vehicle actually has a driving speed which is less than the speed threshold value. However, since the speed value with the limited speed gradient is determined from the measured speed value, it is possible to reliably actuate the parking brake device despite the locking of the wheels. It can be seen from the plot that the speed value falls below the speed threshold value only after the actual speed of the motor vehicle, namely offset by the time offset Δt.

Figure 3:
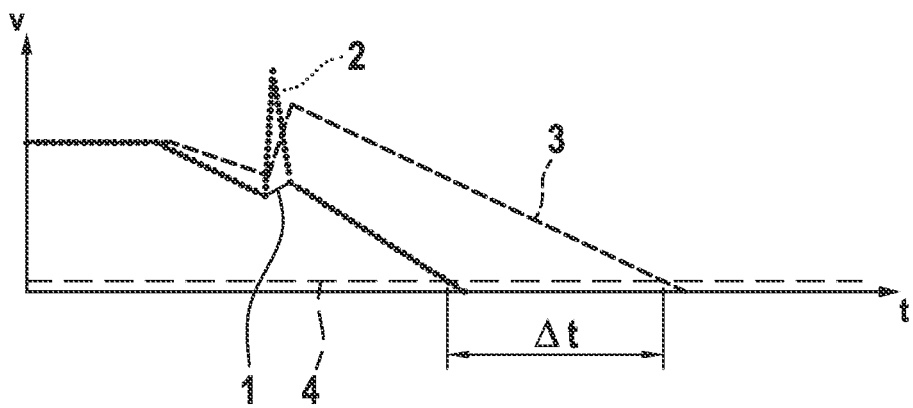
FIG. 3 shows a third plot in which the actual speed, the measured speed value and the speed value are again plotted over time.

FIG. 3 shows a plot. It again plots speed curves 1, 2 and 3 and the speed threshold value over time. However, an extended method is used to determine the speed value. In this method, not only is the limiting of the speed gradient performed if the measured speed value falls below the speed value, but also if it is exceeded.

It can be seen that speed curve 2 deviates from speed curve 1 temporarily. In the corresponding time period, the wheels of the motor vehicle spin. However, since the change in the speed value only occurs with the limited speed gradient even if the speed value is exceeded by the measured speed value, the speed value still follows the measured speed value with a delay in this time range. This improves the modeling of the speed value and improves the time offset Δt in contrast to a procedure in which limiting the speed gradient only occurs if the measured speed value falls below the speed value.

Overall, the described method of operating a brake system for a motor vehicle enables the parking brake device to be operated reliably. For this purpose, modeling of the speed value is carried out, based on which the parking brake device is actuated. With physically reasonable assumptions about a maximum possible acceleration and/or a maximum possible deceleration of the motor vehicle, a realistic estimation of the speed value is made, which always follows the actual speed of the motor vehicle.

LIST OF REFERENCE NUMERALS

1 Curve of the speed
2 Curve of the measured speed value
3 Curve of the speed value
4 Curve of the speed threshold value

The invention claimed is:
1. A method of operating a brake system for a motor vehicle, wherein the brake system has a parking brake device, wherein the method comprises:

permitting actuation of the parking brake device for generating a parking braking force on a wheel of the motor vehicle only if a speed value falls below a speed threshold value, determining the speed value from a measured speed value corresponding at least temporarily to a speed of the motor vehicle, while the measured speed value is not below the speed value, using the measured speed value as the speed value, and upon determining that the measured speed value falls below the speed value, triggering having the speed value track the measured speed value with a speed gradient limited to a speed gradient limit value.

2. The method according to claim 1, wherein if an actuation signal is present, the parking brake device is actuated to augment a current parking braking force generated thereby if the speed value is less than the speed threshold value, and is actuated to reduce or keep constant the current parking braking force if the speed value is greater than or equal to the speed threshold value.

3. The method according to claim 1, wherein the measured speed value is determined at least temporarily from a wheel rotational speed measured by means of a wheel rotational speed sensor and/or at least temporarily from a rotational speed of a drive unit drivingly connected to the wheel axle.

4. The method according to claim 1, wherein the measured speed value is determined from the wheel rotational speed measured by means of the wheel rotational speed sensor, as long as a plausibility check of the wheel rotational speed is successful, said plausibility check comprising determining an actual speed of the vehicle by a second sensor other than a rotational sensor and comparing the measured speed value of the wheel rotational speed sensor to an output of the second sensor, and wherein the measured speed value is determined from the rotational speed of a drive unit in the event of a failed plausibility check.

5. The method according to claim 1, wherein if the measured speed value exceeds the speed value, the speed value is set to equal the measured speed value or is made to track the measured speed value with a speed gradient limited to a further speed gradient limit value.

6. The method according to claim 1, wherein the speed gradient limit value and/or the further speed gradient limit value is/are set to be constant or are determined as a function of the speed value.

7. The method according to claim 1, wherein determining the speed value from the measured speed value is carried out with limitation of the speed gradient in a first operating mode, and the speed value is determined from the measured speed value without limitation in a second operating mode.

8. The method according to claim 1, wherein a diagnosis of an anti-lock braking system of the brake system is carried out, wherein, if a fault of the anti-lock braking system is detected, a first operating mode is carried out, and if the anti-lock braking system is faultless, a second operating mode is carried out.

9. The method according to claim 1, wherein a parking brake and/or a stop lock is used as the parking brake device.

10. A brake system for a motor vehicle, wherein the brake system comprises a parking brake device and wherein the brake system is configured to permit actuating the parking brake device for generating a parking braking force on a wheel of the motor vehicle only if a speed value falls below a speed threshold value, wherein the brake system is provided and designed to determine the speed value from a measured speed value corresponding at least temporarily to a speed of the motor vehicle, wherein the brake system is configured to use the measured value as the speed value while the measured speed value is not below the speed value, and wherein the brake system is configured to, if the measured speed value falls below the speed value, have the speed value track the measured speed value with a speed gradient limited to a speed gradient limit value.

11. The method according to claim 2, wherein the measured speed value is determined at least temporarily from a wheel rotational speed measured by means of a wheel rotational speed sensor and/or at least temporarily from a rotational speed of a drive unit drivingly connected to the wheel axle.

12. The method according to claim 2, wherein the measured speed value is determined from the wheel rotational speed measured by means of the wheel rotational speed sensor, as long as a plausibility check of the wheel rotational speed is successful, said plausibility check comprising determining an actual speed of the vehicle by a second sensor other than a rotational sensor and comparing the measured speed value of the wheel rotational speed sensor to an output of the second sensor, and wherein the measured speed value is determined from the rotational speed of a drive unit in the event of a failed plausibility check.

13. The method according to claim 3, wherein the measured speed value is determined from the wheel rotational speed measured by means of the wheel rotational speed sensor, as long as a plausibility check of the wheel rotational speed is successful, said plausibility check comprising determining an actual speed of the vehicle by a second sensor other than a rotational sensor and comparing the measured speed value of the wheel rotational speed sensor to an output of the second sensor, and wherein the measured speed value from the rotational speed of a drive unit in the event of a failed plausibility check.

14. The method according to claim 2, wherein if the measured speed value exceeds the speed value, the speed value is set to equal the measured speed value or is made to track the measured speed value with a speed gradient limited to a further speed gradient limit value.

15. The method according to claim 3, wherein if the measured speed value exceeds the speed value, the speed value is set to equal the measured speed value or is made to track the measured speed value with a speed gradient limited to a further speed gradient limit value.

16. The method according to claim 4, wherein if the measured speed value exceeds the speed value, the speed value is set to equal the measured speed value or is made to track the measured speed value with a speed gradient limited to a further speed gradient limit value.

17. The method according to claim 2, wherein the speed gradient limit value and/or the further speed gradient limit value is/are set to be constant or are determined as a function of the speed value.

18. The method according to claim 3, wherein the speed gradient limit value and/or the further speed gradient limit value is/are set to be constant or are determined as a function of the speed value.

19. The method according to claim 4, wherein the speed gradient limit value and/or the further speed gradient limit value is/are set to be constant or are determined as a function of the speed value.

20. The method according to claim 5, wherein the speed gradient limit value and/or the further speed gradient limit value is/are set to be constant or are determined as a function of the speed value.

* * * * *